United States Patent [19]

Takanashi et al.

[11] Patent Number: 5,003,402

[45] Date of Patent: Mar. 26, 1991

[54] APPARATUS FOR RECORDING AND REPRODUCING CHARGE LATENT IMAGE

[75] Inventors: Itsuo Takanashi, Kamakura; Shintaro Nakagaki, Fujisawa; Hirohiko Shinonaga; Tsutou Asakura, both of Yokohama; Masato Furuya; Hiromichi Tai, both of Yokosuka, all of Japan

[73] Assignee: Victor Company of Japan, Ltd., Japan

[21] Appl. No.: 433,240

[22] Filed: Nov. 8, 1989

Related U.S. Application Data

[63] Continuation-in-part of Ser. No. 347,640, May 5, 1989.

[30] Foreign Application Priority Data

Nov. 10, 1988 [JP] Japan .................................. 63-284343
Jan. 31, 1989 [JP] Japan .................................... 1-21789

[51] Int. Cl.$^5$ ........................ H04N 1/46; H04N 1/40; H04N 1/29
[52] U.S. Cl. ..................................... 358/300; 358/75; 358/209; 358/474; 358/230; 346/157
[58] Field of Search ................. 358/300, 75, 209, 230, 358/474; 346/157

[56] References Cited

U.S. PATENT DOCUMENTS 4,459,512  6/1984  Ohhata .
4,899,175  2/1990  Harada ................................. 358/75

Primary Examiner—Mark J. Reinhart
Assistant Examiner—Scott A. Rogers
Attorney, Agent, or Firm—Lowe, Price, LeBlanc, Becker & Shur

[57] ABSTRACT

A charge latent image is formed on a recording medium in response to information and a reference pattern so that the information and the reference pattern are recorded on the recording medium. During a reproducing process, the information is read out from the recording medium and an information signal representing the readout information is generated. In addition, the reference pattern is read out from the recording medium and a reference signal representing the reference pattern is generated. The information is demodulated from the information signal. The reference signal is used in the demodulation of the information from the information signal.

2 Claims, 13 Drawing Sheets

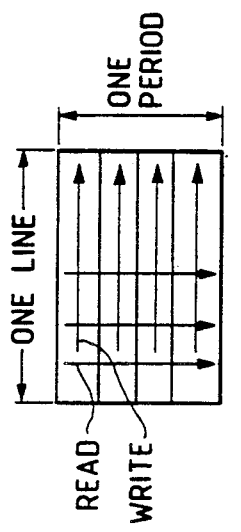
FIG. 8(a)
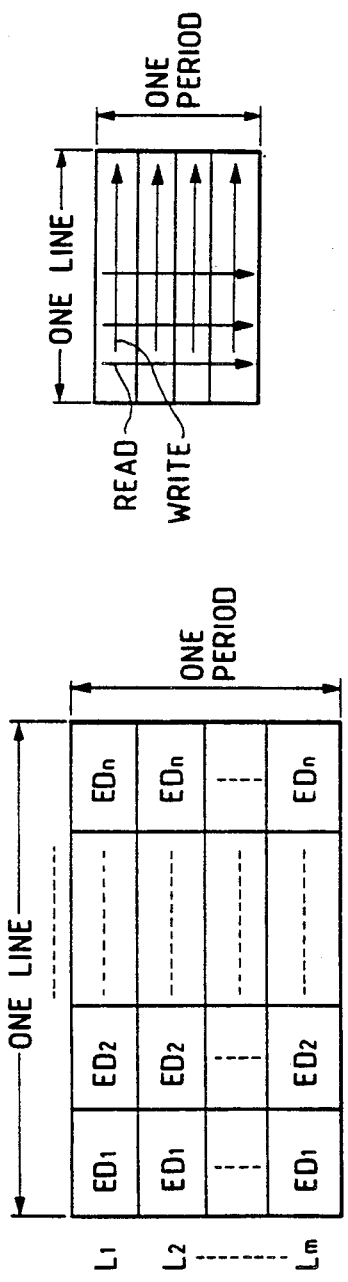
FIG. 8(b)
FIG. 9(a)
FIG. 9(b)
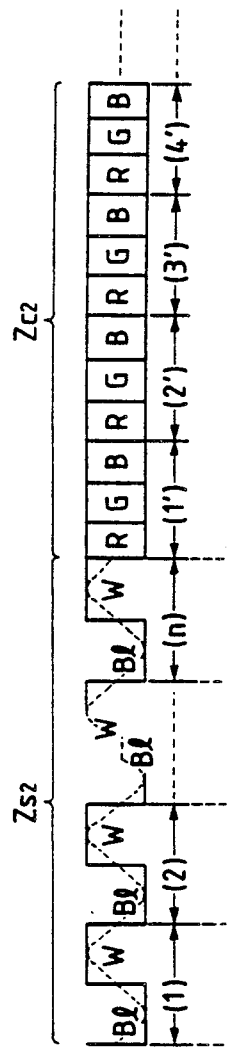

APPARATUS FOR RECORDING AND REPRODUCING CHARGE LATENT IMAGE

CROSS-REFERENCES TO RELATED APPLICATIONS

This is a continuation-in-part of application Ser. No. 347,640, filed May 5, 1989.

BACKGROUND OF THE INVENTION

This invention relates to an apparatus for recording and reproducing a charge latent image.

In some image recording systems, a photoelectric transducer section enables a charge storage member to be charged in accordance with an optical image of an object and thereby allows a charge latent image to be formed on the charge storage member. The distribution of an electric surface potential of the charge storage member represents the optical image. In some reproducing systems, a surface potential sensor of an electrostatic induction type is used in detecting the distribution of such an electric surface potential and generating a corresponding electric signal.

Generally, during the detection of a surface potential distribution of a charge latent image, the charge latent image is scanned by the surface potential sensor. In some cases, an output signal from the surface potential sensor is contaminated by error components which relate to the positional relation between the surface potential sensor and the charge latent image. It is desirable to compensate for such error components.

SUMMARY OF THE INVENTION

It is an object of this invention to provide an excellent recording and reproducing apparatus using a charge latent image.

According to a first aspect of this invention, an apparatus for recording and reproducing a color image via a charge latent image comprises an optical filter including a color separation section and an index section, the color separation section including recurrent groups each having stripes of at least three different colors, the index section including a pattern related to a period of the recurrent groups in the color separation section; a photoconductive member; a recording member; means for focusing an optical image on the photoconductive member via the filter; means for forming a charge latent image on the recording member in response to the optical image on the photoconductive member, the charge latent image having a color information region corresponding to the color separation section of the filter and an index region corresponding to the index section of the filter; means for detecting the charge latent image on the recording member; means for generating a color information signal in accordance with the detected charge latent image related to the color information region; means for generating an index signal in accordance with the detected charge latent image related to the index region; and means for demodulating color information from the generated color information signal on the basis of the generated index signal.

According to a second aspect of this invention, an apparatus for recording and reproducing a color image via a charge latent image comprises an optical filter including a color separation section and an index section, the color separation section including recurrent groups each having parallel stripes of at least three different colors, the index section including a pattern of parallel stripes extending parallel to the stripes in the color separation section, the pattern being related to a period of the recurrent groups in the color separation section; a photoconductive member; a recording member; means for focusing an optical image on the photoconductive member via the filter; means for forming a charge latent image on the recording member in response to the optical image on the photoconductive member, the charge latent image having a color information region corresponding to the color separation section of the filter and an index region corresponding to the index section of the filter; means for scanning the charge latent image in a main scanning direction approximately corresponding to a longitudinal direction of the stripes in the filter and scanning the charge latent image in a sub scanning direction substantially perpendicular to the main scanning direction to sequentially detect segments of the charge latent image on the recording member, and for generating a first signal sequentially representing the detected segments of the charge latent image, wherein the detected segments represented by the first signal are ordered on a time axis along a direction corresponding to the main scanning direction; means for converting the first signal into a second signal sequentially representing the detected segments of the charge latent image, wherein the detected segments represented by the second signal are ordered on a time axis along a direction corresponding to the sub scanning direction; means for generating a color information signal on the basis of the second signal representing the detected segments of the charge latent image which relate to the color information region; means for generating a reference signal on the basis of the second signal representing the detected segments of the charge latent image which relate to the index region; and means for demodulating color information from the generated color information signal on the basis of the generated reference signal.

According to a third aspect of this invention, an apparatus for recording and reproducing a charge latent image comprises means for forming a charge latent image on an information region of a recording medium in response to information and recording the information into the information region of the recording medium; means for forming a charge latent image on a reference region of the recording medium in response to a positional reference pattern and recording the positional reference pattern into the reference region of the recording medium, the reference region extending along a side of the information region; means for reading out the information from the recording medium and generating an information signal representing the readout information; means for reading out the positional reference pattern from the recording medium and generating a corrective signal on the basis of the readout positional reference pattern, wherein the corrective signal depends on a positional relation between the recording medium and the information reading means; and means for correcting the generated information signal in accordance with the corrective signal.

BRIEF DESCRIPTION OF THE DRAWINGS

FIG. 8 is a diagram showing a manner of the signal write into and the signal read from a memory in the first embodiment.

FIG. 9 is a diagram showing the relation between the index signal and the color information signal in the first embodiment.

Like and corresponding elements are denoted by the same reference characters throughout the drawings.

DESCRIPTION OF THE FIRST PREFERRED EMBODIMENT

Figure 1:
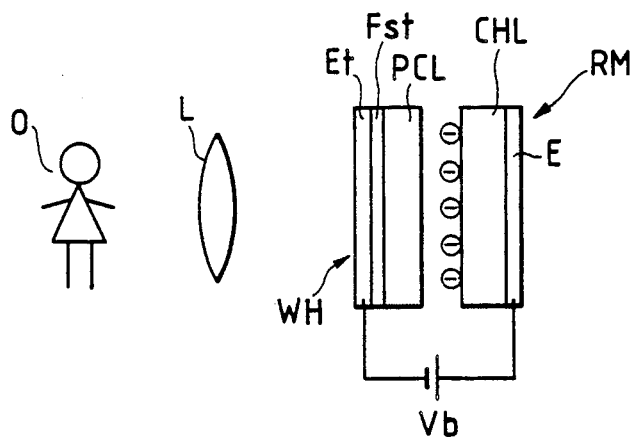
FIG. 1 is a diagram of a recording system according to a first embodiment of this invention.

FIG. 1 shows a system for recording a charge latent image on a recording medium RM. A scene of an object O is focused by a lens L on a recording head (a writing head) WH which generates a charge latent image on the recording medium RM in correspondence with the scene of the object O.

The recording medium RM has a laminated structure including a charge latent image forming layer CHL and an electrode layer E. The electrode layer E functions as a base plate of the recording medium RM. The image forming layer CHL is made of highly insulating material.

The recording head WH has a laminated structure including a transparent electrode layer Et, a color separation filter layer Fst, and a photoconductive layer PCL. The photoconductive layer PCL of the recording head WH opposes the latent image forming layer CHL of the recording medium RM.

The positive terminal of a dc power source Vb is electrically connected to the electrode layer E of the recording medium RM. The negative terminal of the dc power source Vb is electrically connected to the electrode layer Et of the recording head WH. The combination of the electrode layers E and Et, and the dc power source Vb functions to apply an electric field to a region between the electrode layers E and Et which accommodates the photoconductive layer PCL of the recording head WH.

An optical image of the object O is focused by the lens L on the photoconductive layer PCL of the recording head WH through the transparent electrode layer Et and the color separation filter layer Fst of the recording head WH. The electric resistance of the photoconductive layer PCL of the recording head WH varies in accordance with the focused optical image of the object O so that a charge latent image is formed on the image forming layer CHL of the recording medium RM in correspondence with the optical image of the object O as disclosed in European patent application No. 89300633.8 by the same applicant.

The recording medium RM may have any one of various shapes such as a disk shape, a tape shape, a sheet shape, and a card shape.

Figure 2:
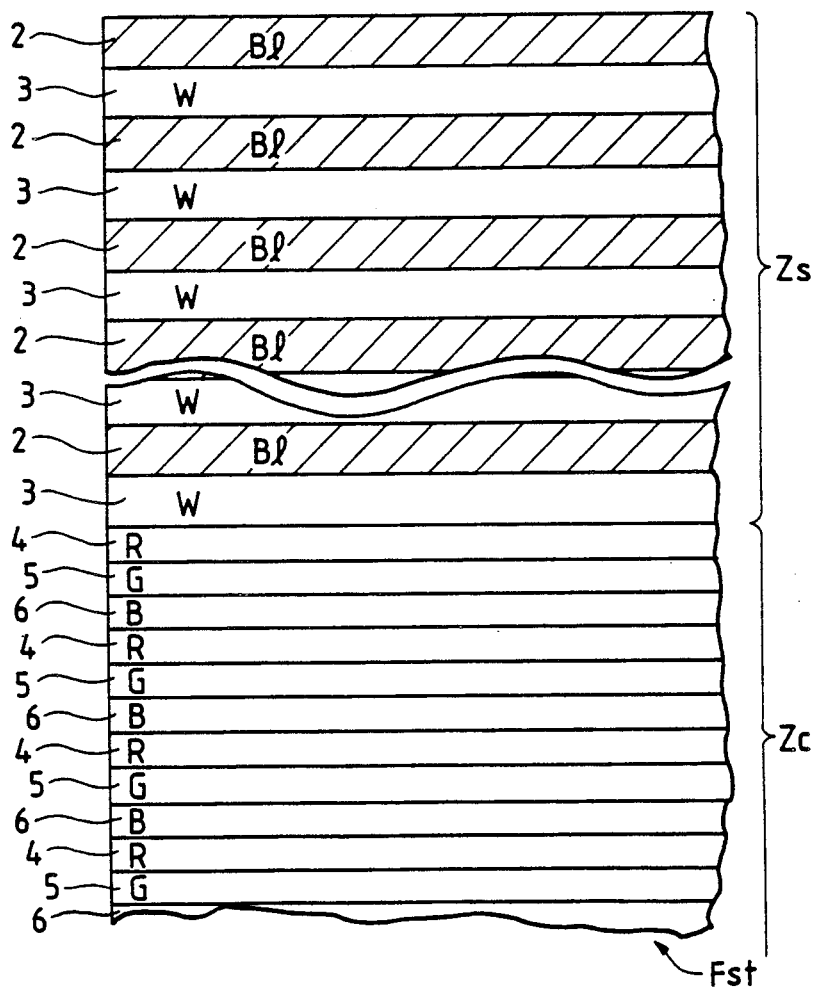
FIG. 2 is a plan view of part of the color separation filter in FIG. 1.

As shown in FIG. 2, the color separation filter Fst has an index region Zs and an image information region Zc. In the index region Zs, opaque stripes 2 and transparent stripes 3 are alternately arranged in parallel. A pair of the opaque stripe 2 and the transparent stripe 3 corresponds to one period of an index signal which will be described later. The image information region Zc has recurrent groups each composed of parallel stripes 4, 5, and 6 of red (R), green (G), and blue (B). The stripes 4, 5, and 6 of the image information region Zc extend in parallel with the stripes 2 and 3 of the index region Zs. The width of one group of the color stripes 4, 5, and 6 in the image information region Zc is equal to the width of a pair of the stripes 2 and 3 of the index region Zs.

Figure 5:
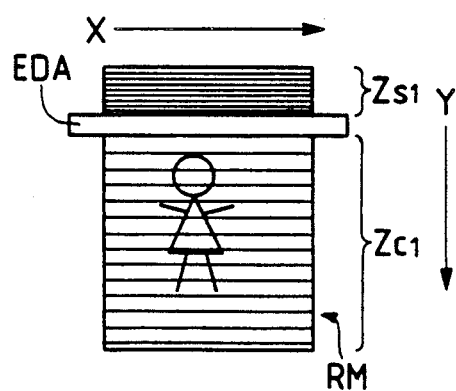
FIG. 5 is a plan view of the reading device and the recording medium in the first embodiment.

As shown in FIG. 5, the charge latent image formed on recording medium RM has an index portion Zs1 and an effective portion Zc1 which correspond to the index region Zs and the image information region Zc of the color separation filter Fst respectively. Specifically, the index portion Zs1 of the charge latent image is composed of an alternate arrangment of "black" stripes corresponding to the opaque stripes 2 of the color separation filter Fst and "white" stripes corresponding to the transparent stripes 3 of the color separation filter Fst. In correspondence with the color stripe arrangement of the image information region Zc of the color separation filter Fst, the effective portion Zc1 of the charge latent image is divided into recurrent groups each composed of stripes corresponding to red (R), green (G), and blue (B) respectively.

Figure 3:
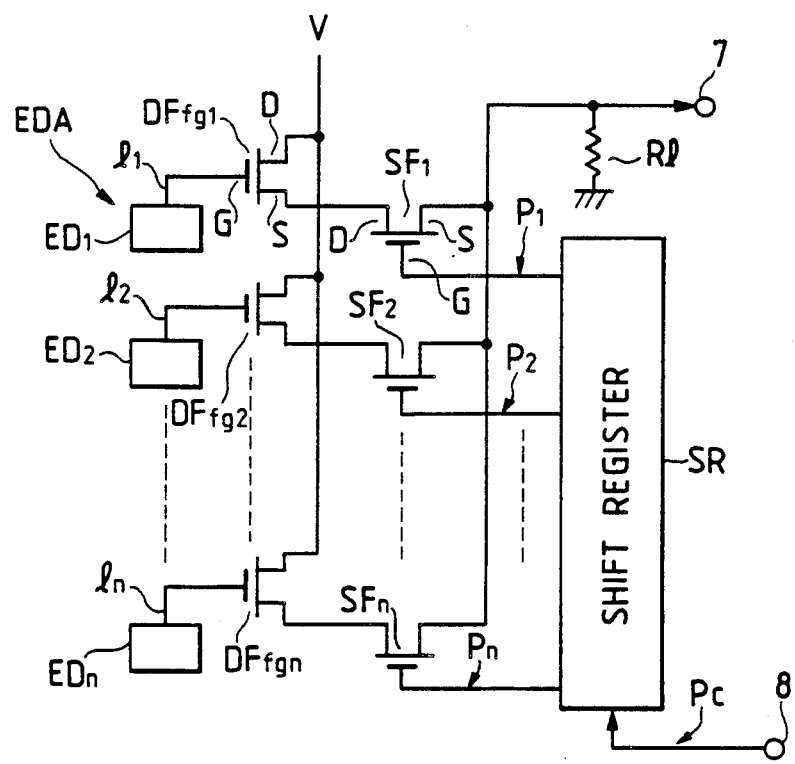
FIG. 3 is a diagram of a reading device in the first embodiment.

FIG. 3 shows a reading device EDA which is used in detecting a charge latent image on the recording medium RM. The reading device EDA has sensing electrodes ED1-EDn which are connected to the gates of detecting field-effect transistors DFfg1-DFfgn via connection lines l1-ln respectively. The detecting transistors DFfg1-DFfgn are of the floating-gate MOS type. The drains of the detecting transistors DFfg1-DFfgn are connected in common to a power supply line V. The sources of the detecting transistors DFfg1-DFfgn are connected to the drains of switching field-effect transistors SF1-SFn respectively. The sources of the switching transistors SF1-SFn are connected in common to an output terminal 7. A load resistor Rl is connected between the output terminal 7 and the ground.

The switching transistors SF1-SFn serve as switches connecting and disconnecting the detecting transistors DFfg1-DFfgn to and from the output terminal 7. In each of the switching transistors SF1-SFn, the source-drain path is made conductive and nonconductive when the gate receives a high level voltage and a low level voltage respectively. In other words, each of the switching transistors SF1-SFn is made on and off when its gate receives a high level voltage and a low level voltage respectively.

The gates of the switching transistors SF1-SFn are connected to respective output terminals of a shift register SR and are thus subjected to output signals P1-Pn from the shift register SR. A clock terminal of the shift register SR receives a clock signal Pc via a clock input terminal 8, the clock signal Pc taking a waveform as shown in FIG. 4.

Figure 4:
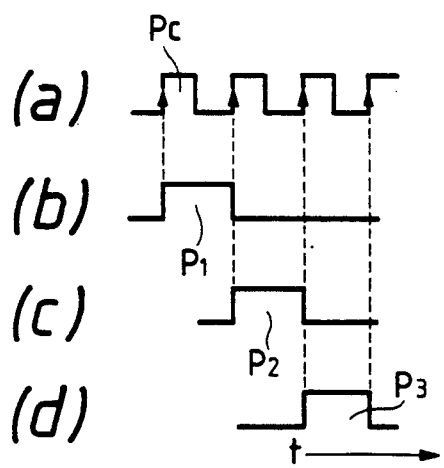
FIG. 4 is a timing diagram showing the waveforms of an input signal and output signals into and from the shift register of FIG. 3.

As shown in FIG. 4, the output signals P1-Pn from the shift register SR sequentially assume high levels in response to the input clock signal Pc. Accordingly, the switching transistors SF1-SFn are sequentially made on in accordance with the clock signal Pc.

As shown in FIG. 5, the reading device EDA has a straight elongate body. The sensing electrodes ED1-EDn are arranged in a line along the body of the reading device EDA. The reading device EDA is placed close to the recording medium RM. In general, the reading device EDA is set in parallel to the horizontal direction X (also referred to as the main scanning direction X) of the image-holding square region of the recording medium RM. Accordingly, the line of the sensing electrodes ED1-EDn extends in parallel to the horizontal direction X. The recording medium RM is previously charged in correspondence with an optical image of the object O and thus has a charge latent image. The distribution of an electric surface potential at a recording surface of the recording medium RM represents the charge latent image. The sensing electrodes ED1-EDn are opposed to the recording surface of the recording medium RM. By electrostatic induction, the sensing electrodes ED1-EDn are subjected to voltages corresponding to surface potentials of portions of the recording medium RM which oppose the sensing electrodes ED1-EDn respectively. The induced voltages are transmitted from the sensing electrodes ED1-EDn to the gates of the detecting transistors DFfg1-DFfgn via the connection lines l1-ln respectively.

The switching transistors SF1-SFn are sequentially made on. Accordingly, voltage signals corresponding to the voltages of the gates of the detecting transistors DFfg1-DFfgn are sequentially transmitted from the sources of the detecting transistors DFfg1-DFfgn to the output terminal 7 via the source drain paths of the switching transistors SF1-SFn. Thus, an output signal generated at the output terminal 7 has time-domain variation which corresponds to the distribution of the surface potential of the horizontal linear portion of the recording medium RM. In this way, a linear portion of the charge latent image is scanned in a time-dependent manner.

A suitable drive mechanism (not shown) moves the reading device EDA relative to the recording medium RM along the vertical direction Y (also referred to as the sub scanning direction Y) of the image-holding square region of the recording medium RM. This vertical movement of the reading device EDA is suitably combined with the previously-mentioned linear scanning of the charge latent image, so that the charge latent image is two-dimensionally scanned in a line-by-line manner. Thus, the output signal from the reading device EDA has a time-domain variation representative of the two-dimensional distribution of the surface potential on the recording medium RM which corresponds to the charge latent image. As a result of the two-dimensional scanning of the charge latent image, the output signal from the reading device EDA sequentially represents first lines corresponding to respective pairs of the stripes 2 and 3 in the index region Zs of the color separation filter Fst and second lines corresponding to respective groups of the color stripes 4–6 in the image information region Zc of the color separation filter Fst.

During the fabrication of the reading device EDA, a semiconductor substrate (not shown) is formed with a pattern corresponding to the sensing electrodes ED1-EDn, the connection lines l1-ln, the detecting transistors DFfg1-DFfgn, and other devices. The pattern-formed substrate is coated with an insulating film of suitable material such as silicon dioxide to seal the sensing electrodes ED1-EDn, the connection lines l1-ln, the detecting transistors DFfg1-DFfgn, and other devices. This sealing structure enables reliable operation of the reading device EDA.

Figures 6, 7:
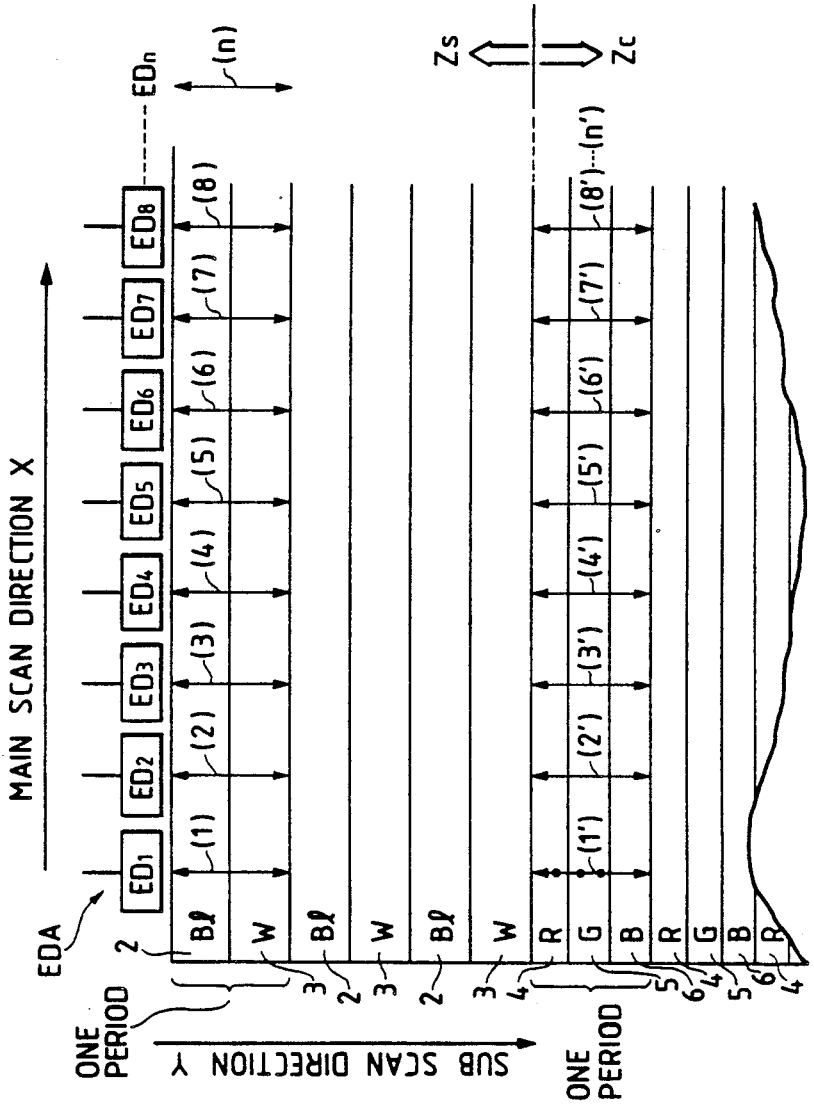
FIG. 6 is a diagram related to the processing of the output signal from the reading device in the first embodiment.
FIG. 7 is a diagram of the output signal from the reading device in the first embodiment.

FIG. 6 shows operating conditions of the reading device EDA in which the direction of the line of the sensing electrodes ED1-EDn exactly agrees with the longitudinal direction X of the stripes 2–6 of the color separation filter Fst, and the sensing electrodes ED1-EDn are moved exactly along the direction Y perpendicular to the direction X. Under these conditions, unwanted crosses between different colors are prevented.

As shown in FIG. 7, one line of the output signal from reading device EDA has n pixels corresponding to the respective sensing electrodes ED1-EDn. The output signal from the reading device EDA is sequentially stored into a memory in a manner as shown by the "write" arrows in the part (b) of FIG. 8. The part (a) of FIG. 8 shows the arrangement of portions of the stored signal in the memory. In the part (a) of FIG. 8, the characters L1-Lm denote the respective line portions of the stored signal, and the characters ED1-EDn denote the respective portions of the stored signals which are obtained via the respective sensing electrodes ED1-EDn. One period in the part (a) of FIG. 8 corresponds to one period in FIG. 6 which is an interval extending along the sub scanning direction Y. In FIG. 6, the arrow lines (1)-(n) and (1)'-(n)' denote intervals or distances which are travelled by the sensing electrodes ED1-EDn during one period. Since one period corresponds to a pair of the stripes 2 and 3 in the index region Zs of the color separation filter Fst or a group of the color stripes 4-6 in the image information region Zc of the color separation filter Fst, the signal portions corresponding to m lines are stored into the memory during one period as shown in the part (a) of FIG. 8 where the letter m denotes an integer greater than three.

For example, the number n of the sensing electrodes ED1-EDn is 512, and the reading device EDA outputs a signal corresponding to 12 (=m) lines during the movement of the reading device EDA along the sub scanning direction Y through an interval corresponding to one period.

The portions of the stored signal, the number of which data equals the product nXm of the number n of the sesing electrodes by the number m of the lines per one period, are read out from the memory in a sequence as expressed by the "read" arrows in the part (b) of FIG. 8. In this case, as shown in the part (a) of FIG. 9, the readout signal portions corresponding to the index portion Zs1 of the charge latent image form an index signal Zs2 having a reference period. In addition, the readout signal portions corresponding to the effective portion Zc1 of the charge latent image form a color information signal Zc2 including a recurrent sequence of red (R), green (G), and blue (B) point signals. The signal components (1)-(n) and (1)', (2)', (3)', . . . in the part (a) of FIG. 9 are generated in correspondence with the intervals (1)-(n) and (1)'-(n)' of FIG. 6. The part (b) of FIG. 9 illustrates the color information signal Zc2 in a manner as to make clear the relation in period between the color information signal Zc2 and the index signal Zs2. As understood from the parts (a) and (b) of FIG. 9, the index signal Zs2 can be used as a color demodulating carrier (a carrier for synchronous detection) of the red, green, and blue point signals.

Figure 10:
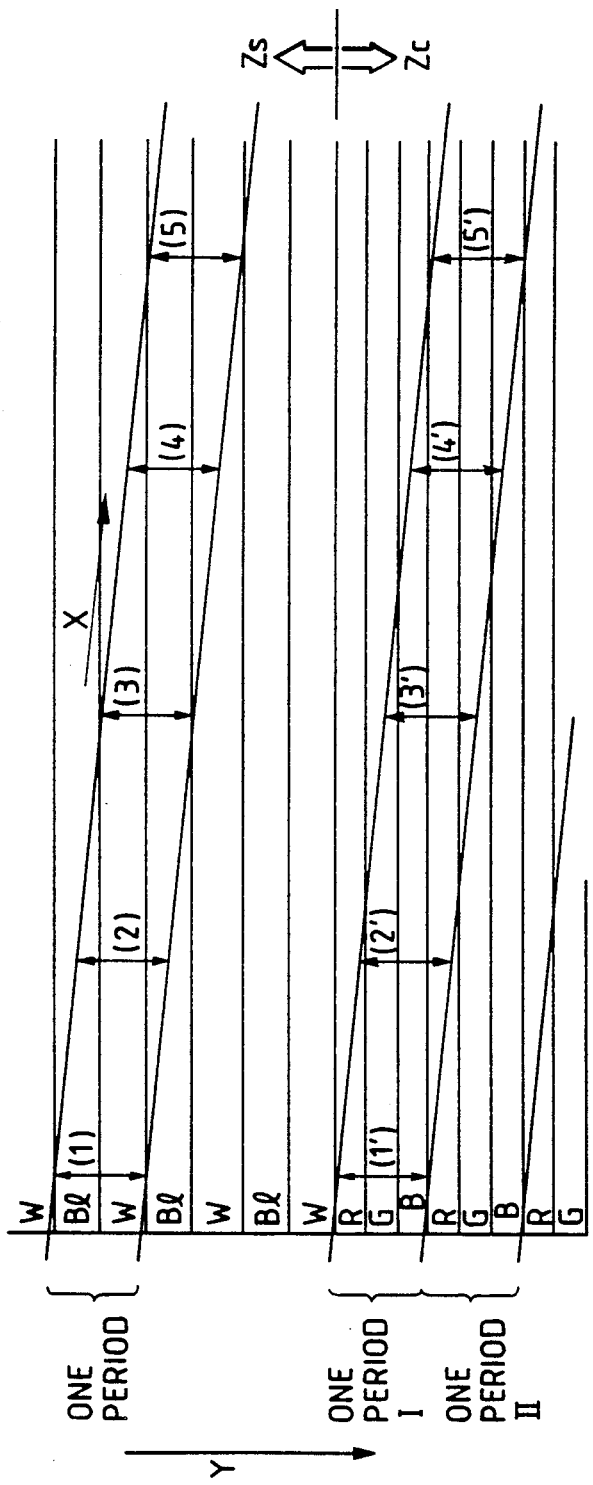
FIG. 10 is a diagram showing the positional relation between a color separation filter and scanning directions in a case different from that of FIG. 6.

FIG. 10 shows the positional relation between the color separation filter Fst and the scanning directions X and Y in a case where the reading device EDA is set so that the direction of the line of the sensing electrodes ED1-EDn deviates from the longitudinal direction of the stripes 2-6 of the color separation filter Fst. The sub scanning direction Y is perpendicular to the longitudinal direction of the stripes 2-6 of the color separation filter Fst.

Figure 11:
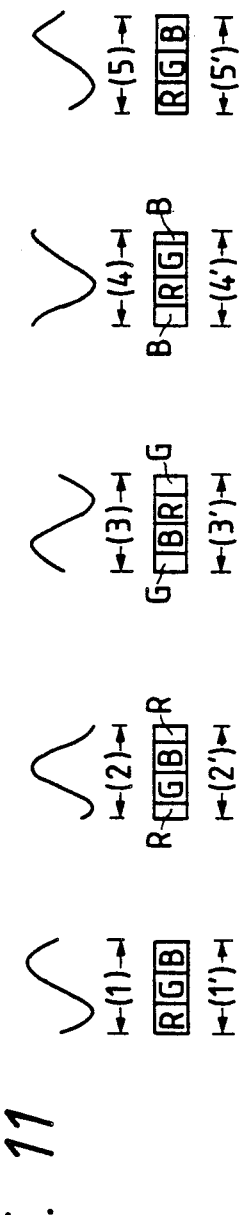
FIG. 11 is a diagram showing the relation between the index signal and the color information signal in the case of FIG. 10.

In respect of the index portion of the charge latent image which corresponds to the index region Zs of the color separation filter Fs, reading-device output-signal portions generated in correspondence with respective periods (1), (2), (3), . . . of FIG. 10 are converted into respective memory output signals (1), (2), (3), . . . of FIG. 11 which compose an index signal. In respect of the effective region of the charge latent image which corresponds to the image information region Zc of the color separation filter Fst, reading-device output-signal portions generated in correspondence with respective periods (1)', (2)', (3)', . . . of FIG. 10 are converted into respective memory output signals (1)', (2)', (3)', . . . of FIG. 11 which include respective groups of red (R), green (G), and blue (B) point signals. As understood from FIG. 11, the waveforms of the index signal portions have a definite relation with the sequential arrangements of the color point signals in FIG. 11, so that the index signal portions (1), (2), (3), . . . can be used as color demodulating carriers of respective color point signal groups (1)', (2)', (3)', . . . . In this case, unwanted crosses between different colors can be prevented although the main scanning direction X deviates from the longitudinal direction of the color stripes of the color separation filter Fst.

Figure 12:
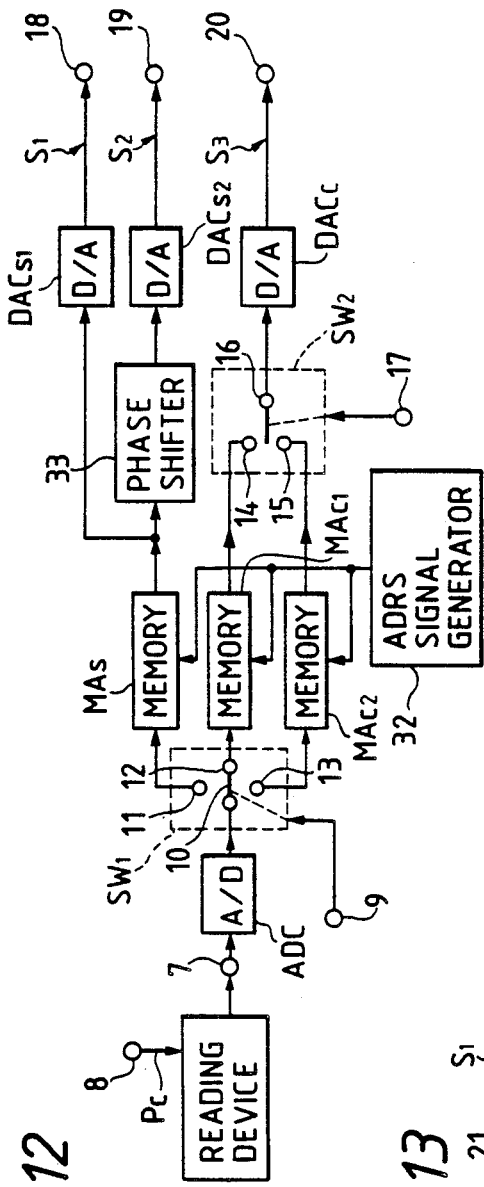
FIG. 12 is a block diagram of a circuit for processing the output signal from the reading device in the first embodiment.

As shown in FIG. 12, the output signal from the reading device EDA is applied to an analog-to-digital converter ADC via the output terminal 7 and is converted by the converter ADC into a corresponding digital signal. The digital output signal from the converter ADC is fed to a movable contact 10 of a switch SW1. The switch SW1 has three fixed contacts 11, 12, and 13. The movable contact 10 is connected to one of the fixed contacts 11-13 in accordance with a switch control signal applied via a terminal 9. The fixed contacts 11, 12, and 13 are connected to memories MAs, MAc1, and MAc2 respectively.

When the index portion Zs1 of the charge latent image is scanned by the reading device EDA, the movable contact 10 is connected to the fixed contact 11 of the switch SW1 so that the digital output signal from the converter ADC is written into the memory MAs via the switch SW1. In this way, a digital index signal is stored into the memory MAs. When the effective portion Zc1 of the charge latent image is scanned by the reading device EDA, the movable contact 10 is connected to one of the fixed contacts 12 and 13 of the switch SW1 so that the digital output signal from the converter ADC is written into one of the memories MAc1 and MAc2 via the switch SW1.

The relation between the operations of the memories MAc1 and MAc2 is designed as follows. When the digital output signal from the converter ADC is written into one of the memories MAc1 and MAc2, the previously-stored digital signal is read out from the other of the memories MAc1 and MAc2. The digital signals corresponding to respective periods are alternately stored into the memories MAc1 and MAc2, and the stored signals corresponding to respective periods are alternately read out from the memories MAc1 and MAc2. For example, the digital signals corresponding to one period I of FIG. 10 are stored into the memory MAc1, and the digital signals corresponding to the next one period II of FIG. 10 are stored into the other memory MAc2.

The signal write into and the signal read from the memories MAs, MAc1, and MAc2 is designed in a manner as illustrated in the part (b) of FIG. 8. An address signal generator 32 feeds address signals to the memories MAs, MAc1, and MAc2. A control circuit (not shown) feeds write/read control signals to the memories MAs, MAc1, and MAc2. The signal write into and the signal read from the memories MAs, MAc1, and MAc2 are controlled by the address signals, and the write/read control signals. In respect of the memories MAs, MAc1, and MAc2, storage locations into which the digital signal is written and storage locations from which the digital signal is read out are controlled by the address signals.

While the movable contact 10 remains disconnected from the fixed contact 11 of the switch SW1, the digital index signal is read out from the memory MAs and is then fed to a digital-to-analog converter DACs1 and a 90-degree phase shifter 33. The converter DACs1 derives an analog color demodulating reference signal S1 from the input digital signal. The phase shifter 33 shifts the phase of the input digital signal by 90 degrees and outputs a phase-shifted digital signal to a digital-to-analog converter DACs2. The converter DACs2 derives an analog color demodulating reference signal S2 from the input phase-shifted digital signal. The reference signals S1 and S2 are in a quadrature relation with each other. The converters DACs1 and DACs2 outputs the reference signals S1 and S2 to output terminals 18 and 19 respectively.

The memory MAc1 is connected to a fixed contact 14 of a switch SW2. The memory MAc2 is connected to another fixed contact 15 of the switch SW2. A movable contact 16 of the switch SW2 is connected to one of the fixed contacts 14 and 15 in accordance with a switch control signal fed via a terminal 17. The movable contact 16 of the switch SW2 is connected to a digital-to-analog converter DACc.

The change of the switch SW2 has a predetermined timing relation with the change of the switch SW1 as described later. When the movable contact 10 is connected described later. When the movable contact 10 is connected to the fixed contact 12 of the switch SW1, the movable contact 16 is connected to the fixed contact 15 of the switch SW2. When the movable contact 10 is connected to the fixed contact 13 of the switch SW1, the movable contact 16 is connected to the fixed contact 14 of the switch SW2.

The digital color point signals are alternately read out from the memories MAc1 and MAc2 and are then fed to the converter DACc via the switch SW2. The converter DACc converts the input color point signals into a corresponding analog color signal S3 and outputs the signal S3 to an output terminal 20. The analog color signal S3 has a sequence of groups of red, green, and blue point components ordered along the sub scanning direction Y (see FIG. 10).

The analog color signal S3 is expressed by the following equation using Fourier expansion.

$$S3=(Er+Eg+Eb)/3+(3/2\pi)(EG-EB)\cdot\sin\omega t+(3^{\frac{1}{2}}/\pi)\{Er-(\tfrac{1}{2})(Eg+Eb)\}\cos\omega$$

where the characters Er, Eg, and Eb denote red, green, and blue signal components corresponding to the red, green, and blue stripes 4, 5, and 6 of the color separation filter Fst respectively, and $\omega=2\pi f$ (the character "f" denotes a spatial frequency of the color stripe group recurrence in the color separation filter Fst). The first term of the right-hand side of the above equation denotes low frequency components corresponding to luminance components. The second and third terms of the right-hand side of the above equation denote high frequency components which result from the quadrature modulation of the carrier "$\omega t$" with two color difference signals "Eg−Eb" and "Er−(Eg+Eb)/2". Accordingly, the luminance signal "R+G+B" can be obtained from the low frequency components of the color signal S3, and the two color difference signals "G−B" and "R−(G+B)/2" can be obtained from the high frequency components of the color signal S3. Specifically, the two color difference signals "G−B" and "R−(G+B)/2" can be derived through the synchronous detection of the high frequency components of the color signal S3 by use of the quadrature carriers "sin$\omega t$" and "cos$\omega t$".

Figure 13:
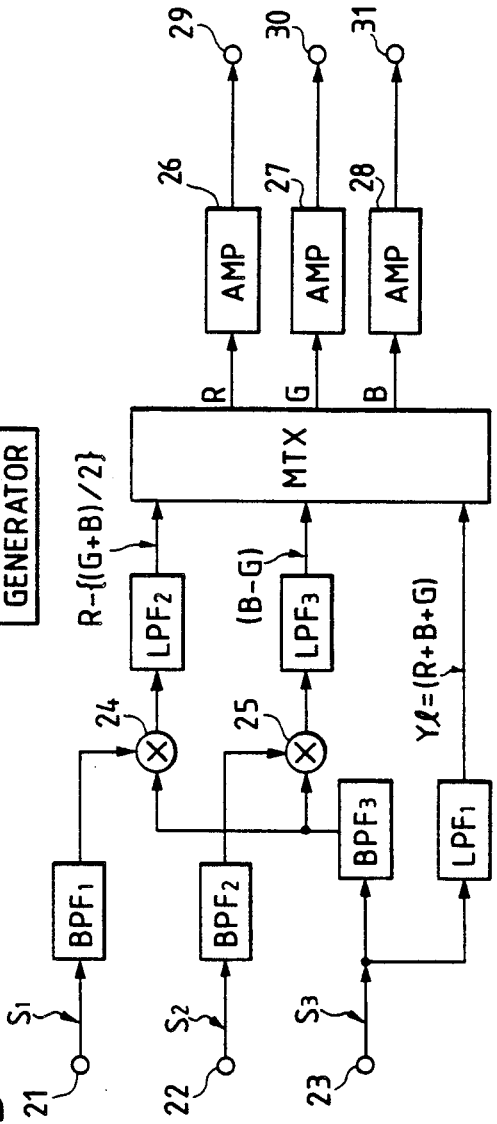
FIG. 13 is a block diagram of a color demodulation circuit in the first embodiment.

FIG. 13 shows a color demodulation circuit. The reference signals S1 and S2, and the color signal S3 are applied to input terminals 21, 22, and 23 of the color demodulation circuit respectively. The reference signal S1 is fed via a band pass filter BPF1 to a synchronous detector 24 as a demodulation carrier (a synchronous detection carrier). The reference signal S2 is fed via a band pass filter BPF2 to a synchronous detector 25 as a demodulation carrier (a synchronous detection carrier). The color signal S3 is fed via a band pass filter BPF3 to the synchronous detectors 24 and 25. In the synchronous detectors 24 and 25, the color signal S3 are subjected to the synchronous detections using the demodulation carriers. A low pass filter LPF2 derives a color difference signal "R−(G+B)/2" from an output signal from the synchronous detector 24. Another low pass filter LPF3 derives another color difference signal "B−G" from an output signal from the synchronous detector 25. The color signal S3 is also fed to a low pass filter LPF1. The low pass filter LPF1 extracts a luminance signal "$Yl=(R+B+G)$" from the color signal S3. A matrix circuit MTX derives primary color signals "R", "G", and "B" from the color difference signals "R−(G+B)/2" and "B−G" and the luminance signal "$Yl=(R+B+G)$". The primary color signals "R", "G", and "B" are outputted to output terminals 29, 30, and 31 of the color demodulation circuit via process amplifiers 26, 27, and 28 respectively.

DESCRIPTION OF THE SECOND PREFERRED EMBODIMENT

Figure 14:
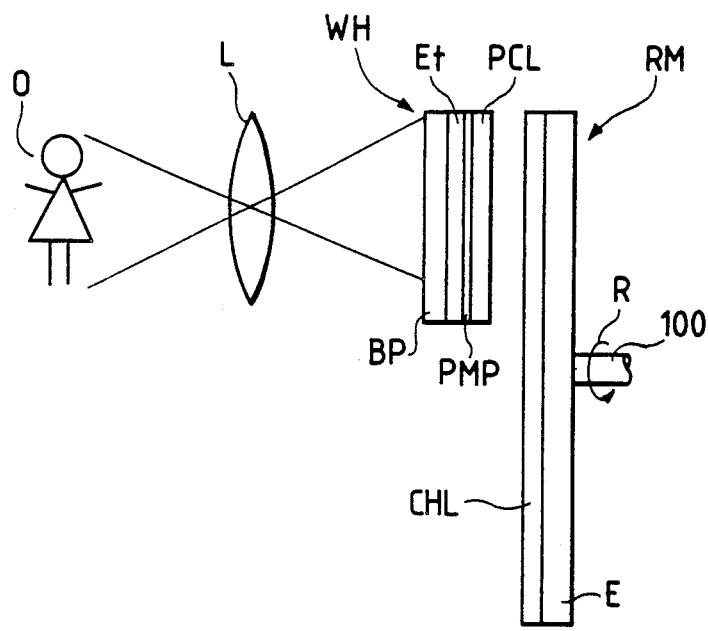
FIG. 14 is a diagram of a recording system according to a second embodiment of this invention.

FIG. 14 shows a system for recording a charge latent image on a recording medium RM. A scene of an object O is focused by a lens L on a recording head (a writing head) WH which generates a charge latent image on a disk-shaped recording medium RM in correspondence with the scene of the object O.

Figure 15:
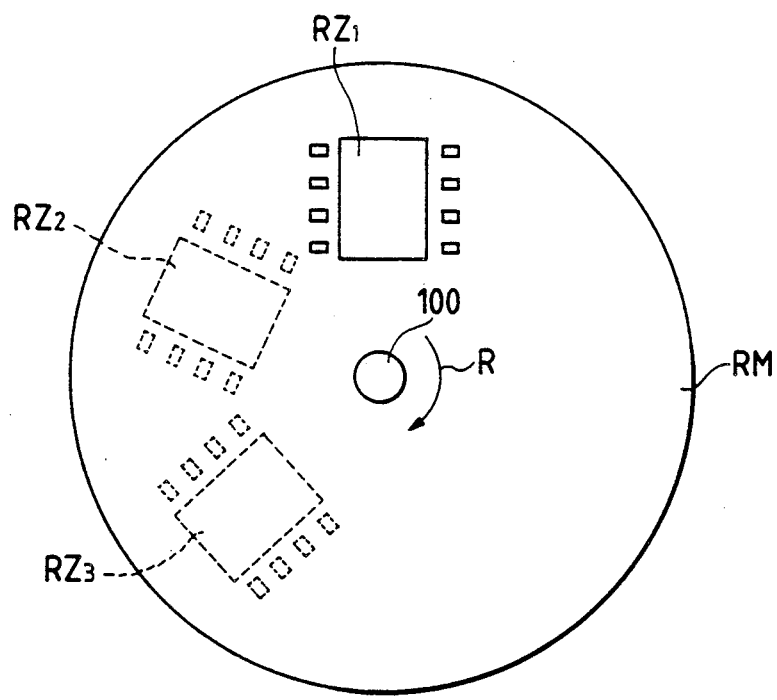
FIG. 15 is a plan view of the recording medium of FIG. 14.

The recording medium RM includes an electrode E and a charge latent image forming member CHL. The electrode E functions as a base plate of the recording medium RM. The image forming member CHL is made of highly insulating material. The recording medium RM is rotatable about a shaft 100. As shown in FIG. 15, when the recording medium RM rotates in a direction R, the charge latent image of the object O is sequentially recorded on areas RZ1, RZ2, ... of the recording medium RM.

The recording head WH has a laminated structure including a glass substrate or base plate BP, a transparent electrode Et, an optical mask PMP, and a photoconductive layer PCL. An electric power source (not shown) is connected between the electrode Et of the recording head WH and the electrode E of the recording medium RM to generate a predetermined electric field between the electrodes Et and E.

In a recording process, an image of the object O is formed by the lens L on the photoconductive layer PCL of the recording head WH, the electric resistance of the photoconductive layer PCL varies in accordance with the image intensity of the object O so that a charge latent image is formed on the member CHL of the recording medium RM in correspondence with the image of the object O as disclosed in the European patent application No. 89300633.8 by the same applicant. It should be noted that the recording medium RM may have other shapes such as a tape shape, a sheet shape, or a card shape.

Figure 16:
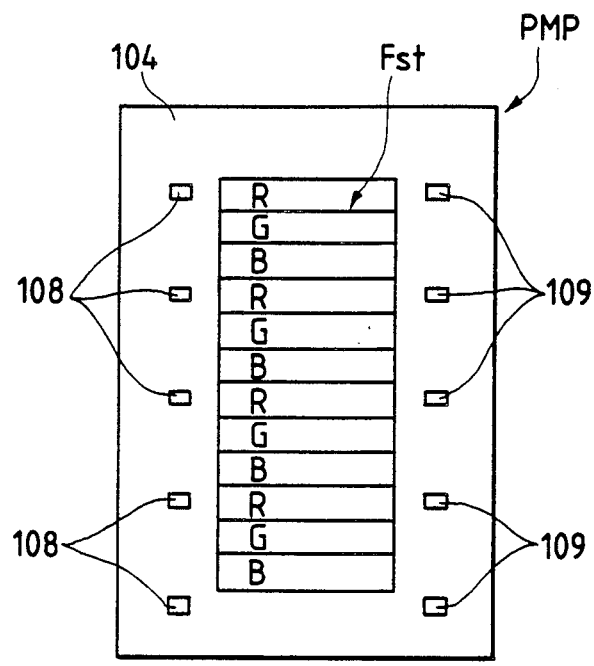
FIG. 16 is a plan view of the optical mask of FIG. 14.

As shown in FIG. 16, the optical mask PMP has a rectangular color separation filter Fst and an opaque region 104 surrounding the color separation filter Fst. Small rectangular transparent sections 108 extend in the opaque region 104 and align at equal intervals along a side of the color separation filter Fst. Similarly, small rectangular transparent sections 109 extend in the opaque region 104 and align at equal intervals along the other side of the color separation filter Fst. The color separation filter Fst has recurrent groups each composed of horizontally-extending parallel stripes of red (R), green (G), and blue (B). The spatial frequency of the groups of the red, green, and blue stripes is equal to the spatial frequency of the transparent sections 108 and 109. The vertical positions of the transparent sections 108 and 109 agree with the vertical positions of the red stripes. The transparent sections 108 and 109 are used to generate reference signals representing positional information.

Figure 17:
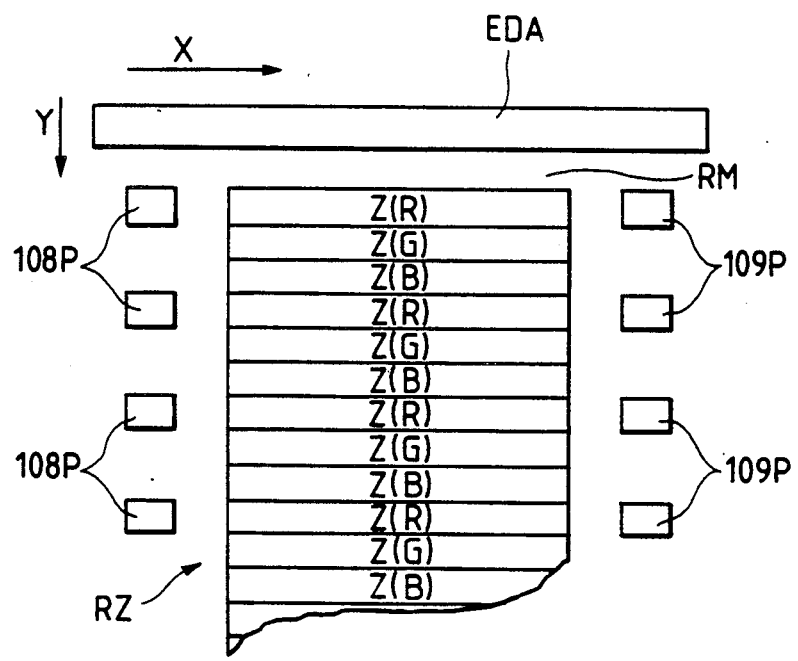
FIG. 17 is a plan view of the reading device and the recording medium in the second embodiment.

As shown in FIG. 17, in correspondence with the color stripe arrangement of the color separation filter Fst, the main portion of the charge latent image formed on the image-forming region Rz of the recording medium RM is divided into recurrent groups each composed of stripes Z(R), Z(G), and Z(B) corresponding to red, green, and blue respectively. In addition, the charge latent image has a pattern of small rectangular reference sections 108P and 109P which corresponds to the pattern of the transparent sections 108 and 109 in the color separation filter Fst. The spatial frequency of the groups of the stripes Z(R), Z(G), and Z(B) is equal to the spatial frequency of the reference sections 108P and 109P. The vertical positions of the reference sections 108P and 109P agree with the vertical positions of the stripes Z(R).

Figure 18:
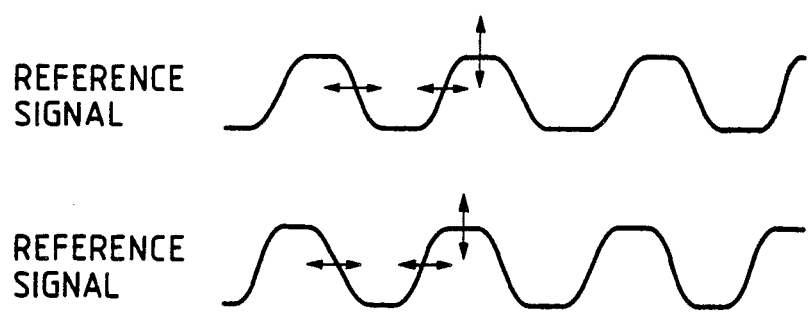
FIG. 18 is a diagram of the waveforms of the reference signals in the second embodiment.

The charge latent image on the image forming region RZ of the recording medium RM is detected by a reading device EDA which includes a structure similar to that shown in FIGS. 3 and 5. The sensing head EDA is relatively moved by a suitable drive mechanism (not shown) through the plane immediately above the image forming region RZ of the recording medium RM to scan the image forming region RZ completely. During the scan of the image forming region RZ of the recording medium RM, the line of the sensing electrodes of the sensing head EDA is held in a direction X roughly or exactly parallel to the stripes Z(R), Z(G), and Z(B) and the sensing head EDA is moved along a direction Y perpendicular to the stripes Z(R), Z(G), and Z(B). The direction X and the direction Y are referred to as the main scanning direction and the sub scanning direction respectively. During the scan of the image forming region RZ of the recording medium RM, the reading device EDA generates color information signals and a pair of reference signals. The color information signals are generated in correspondence with the stripes Z(R), Z(G), and Z(B). The first reference signal is generated in correspondence with the reference section 108P. The second reference signal is generated in correspondence with the reference sections 109P. The parts (a) and (b) of FIG. 18 show the waveforms of the first and second reference signals respectively. As shown in FIG. 18, the reference signals have a constant period corresponding to the spatial frequency of the reference sections 108P and 109P. As the main scanning direction X or the direction of the line of the sensing electrodes in the reading device EDA deviates from the horizontal direction of the image forming region RZ of the recording medium RM, the phases of the first and second reference signals shift. As the reading device EDA separates from the recording medium RM, the amplitudes of the first and second reference signals decrease.

Figure 19:
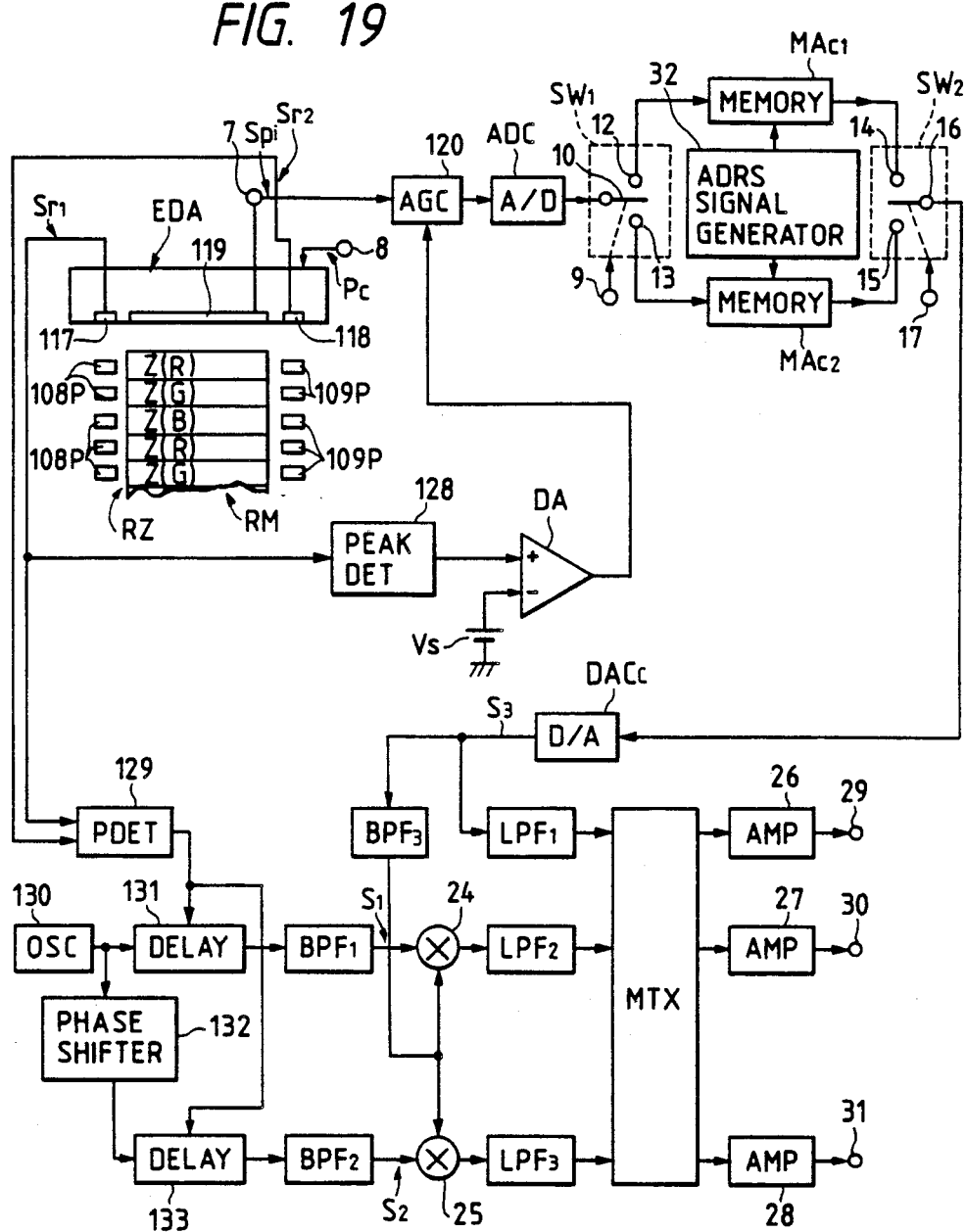
FIG. 19 is a block diagram of a circuit for processing the output signals from the reading device in the second embodiment.

With reference to FIG. 19, the line of the sensing electrodes of the reading device EDA forms a central sensing part 119 which functions to detect the color information from the stripes Z(R), Z(G), and Z(B). The reading device EDA also has a pair of sensing parts 117 and 118 extending at sides of the central sensing parts 119. The sensing parts 117 and 118 are designed to detect the reference sections 108P and 109P respectively. Each of the sensing parts 117 and 118 includes a combination of a sensing electrode and a detecting transistor.

The sensing part 119 generates a color information signal Spi in correspondence with the stripes Z(R), Z(G), and Z(B). The color information signal Spi is fed via an output terminal 7 to an automatic gain control circuit 20. The sensing parts 117 and 118 generate reference signals Sr1 and Sr2 in correspondence with the reference sections 108P and 109P respectively. The sensing parts 117 and 118 output the reference signals Sr1 and Sr2 to a phase detector 129. The reference signal Sr1 is also fed to a peak detector 128.

The peak detector 128 detects the levels of peaks of the reference signal Sr1 which depend on the distance between the reading device EDA and the recording medium RM. The output signal from the peak detector 128 is applied to a first input terminal of a differential amplifier DA. A constant dc voltage source Vs applies a predetermined reference voltage to a second input terminal of the differential amplifier DA. The output signal from the differential amplifier DA depends on the difference between the peak levels of the reference signal Sr1 and the reference voltage, and thus represents the deviation of the actual distance between the reading device EDA and the recording medium RM from a desired distance determined by the reference voltage. The automatic gain control circuit 120 controls the level of the color information signal Spi in accordance with the output signal from the differential amplifier DA so that a color information signal of a constant level can be generated. The level-adjusted color information signal is outputted from the automatic gain control circuit 120 to an analog-to-digital converter ADC. The converter ADC converts the input analog color information signal into a corresponding digital color information signal.

Figure 20:
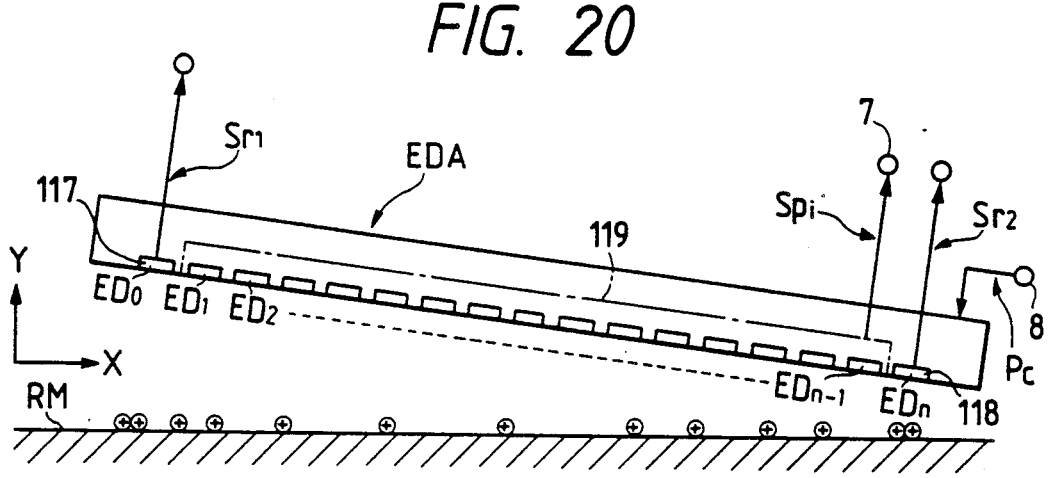
FIG. 20 is a diagram of the reading device and the recording medium in the second embodiment.
Figure 21:
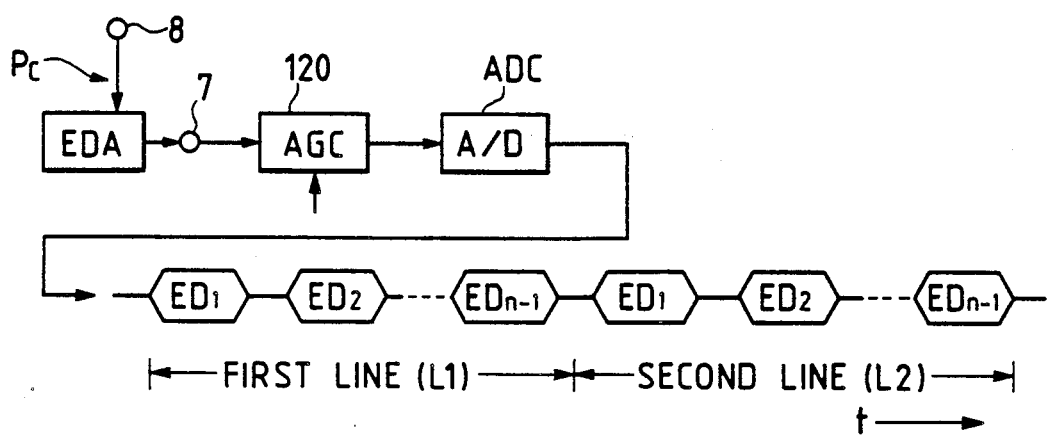
FIG. 21 is a diagram showing the contents of the color information output signal from the analog-to-digital converter in the second embodiment.

As shown in FIG. 20, the central sensing part 119 of the reading device EDA has an "n−1" number of linearly-arranged sensing electrodes ED1, ED2, . . . EDn−1. During the scan of each line, the digital color information signal from the converter ADC sequentially represents color information at an "n−1" number of pixels corresponding to the sensing electrodes ED1, ED2, . . . EDn−1 as shown in FIG. 21.

The digital output signal from the converter ADC is fed to a movable contact 10 of a switch SW1. The switch SW1 has fixed contacts 12 and 13. The movable contact 10 is connected to one of the fixed contacts 12 and 13 in accordance with a switch control signal applied via a terminal 9. The fixed contacts 12 and 13 are connected to memories MAc1 and MAc2 respectively. The relation between the operations of the memories MAc1 and MAc2 is designed as follows. When the digital output signal from the converter ADC is written into one of the memories MAc1 and MAc2, the previously-stored digital signal is read out from the other of the memories MAc1 and MAc2. The digital signals corresponding to respective periods are alternately stored into the memories MAc1 and MAc2, and the stored signals corresponding to respective periods are alternately read out from the memories MAc1 and MAc2 as in the previous first embodiment.

The signal write into and the signal read from the memories MAc1 and MAc2 is designed in a manner as illustrated in the part (b) of FIG. 8. An address signal generator 32 feeds address signals to the memories MAc1 and MAc2. A control circuit (not shown) feeds write/read control signals to the memories MAc1 and MAc2. The signal write into and the signal read from the memories MAc1 and MAc2 are controlled by the address signals, and the write/read control signals. In respect of the memories MAc1, and MAc2, storage locations into which the digital signal is written and storage locations from which the digital signal is read out are controlled by the address signals.

The memory MAc1 is connected to a fixed contact 14 of a switch SW2. The memory MAc2 is connected to another fixed contact 15 of the switch SW2. A movable contact 16 of the switch SW2 is connected to one of the fixed contacts 14 and 15 in accordance with a switch control signal fed via a terminal 17. The movable contact 16 of the switch SW2 is connected to a digital-to-analog converter DACc.

The change of the switch SW2 has a predetermined timing relation with the change of the switch SW1 as described later. When the movable contact 10 is connected to the fixed contact 12 of the switch SW1, the movable contact 16 is connected to the fixed contact 15 of the switch SW2. When the movable contact 10 is connected to the fixed contact 13 of the switch SW1, the movable contact 16 is connected to the fixed contact 14 of the switch SW2.

The digital color point signals are alternately read out from the memories MAc1 and MAc2 and are then fed to the converter DACc via the switch SW2. The converter DACc converts the input color point signals into a corresponding analog color signal S3. The analog color signal S3 has a sequence of groups of red, green, and blue point components ordered along the sub scanning direction Y.

As in the previous first embodiment, the analog color signal S3 has low frequency components corresponding to a luminance signal and high frequency components corresponding to two color difference signals.

The color signal S3 is fed via a band pass filter BPF3 to synchronous detectors 24 and 25. In the synchronous detectors 24 and 25, the color signal S3 are subjected to the synchronous detections using demodulation carriers S1 and S2 which will be described later. A low pass filter LPF2 derives a color difference signal "R−(G+B)/2" from an output signal from the synchronous detector 24. Another low pass filter LPF3 derives another color difference signal "B−G" from an output signal from the synchronous detector 25. The color signal S3 is also fed to a low pass filter LPF1. The low pass filter LPF1 extracts a luminance signal "Yl=(R+B+G)" from the color signal S3. A matrix circuit MTX derives primary color signals "R", "G", and "B" from the color difference signals "R−(G+B)/2" and "B−G" and the luminance signal "Yl=(R+B+G)". The primary color signals "R", "G", and "B" are outputted to output terminals 29, 30, and 31 via process amplifiers 26, 27, and 28 respectively.

The phase detector 129 generates a signal representing the difference in phase between the reference signals Sr1 and Sr2. The output signal from the phase detector 129 depends on the deviation of the main scanning direction X from the longitudinal direction of the stripes Z(R), Z(G), and Z(B). The output signal from the phase detector 129 is applied to variable delay circuits 131 and 133 as a delay control signal. An oscillator 130 outputs a signal having a frequency which agrees with the frequency of the groups of red, green, and blue components in the color signal S3. The output signal from the oscillator 130 is applied to the delay circuit 131 and a 90-degree phase shifter 132. The phase shifter 132 shits the phase of the oscillator output signal by 90 degrees and generates a phase-shifted signal. The output signal from the phase shifter 132 is applied to the delay circuit 133. The output signals from the oscillator 130 and the phase shifter 132 have a quadrature relation with each other. The delay circuit 131 delays the output signal from the oscillator 131 by a time determined by the output signal from the phase detector 129. The output signal from the delay circuit 131 is applied to the synchronous detector 24 through a band pass filter BPF1 as the color demodulating carrier S1. The delay circuit 133 delays the output signal from the phase shifter 132 by a time determined by the output signal from the phase detector 129. The output signal from the delay circuit 133 is applied to the synchronous detector 25 through a band pass filter BPF2 as the color demodulating carrier S2. As understood from the previous description, the color demodulating sub carriers S1 and S2 are controlled in accordance with the deviation of the main scanning direction X from the longitudinal direction of the stripes Z(R), Z(G), and Z(B). Therefore, the red point color information, the green point color information, and the blue point color information can be reproduced accurately without any crosses therebetween.

Figure 22:
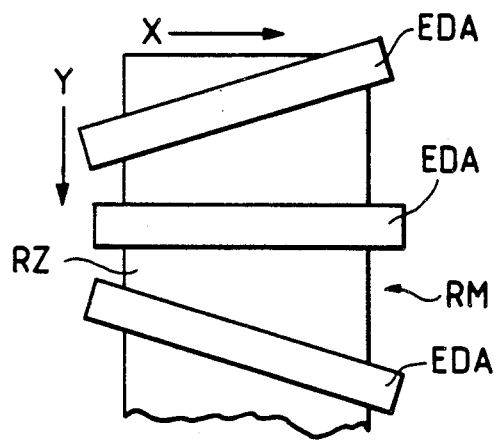
FIG. 22 is a diagram showing the positional relation between the reading device and the image forming region of the recording medium which occurs during the scan of the charge latent image.

This embodiment has the following remarkable advantage. It is now assumed that, during the scan of the whole of the image forming region RZ, the angle between the longitudinal direction of the reading device EDA and the horizontal direction of the image forming region RZ changes as shown in FIG. 22. The arrangement of the reference regions 108P and 109P enables the sensing parts 117 and 118 to detect such a change of the angle between the longitudinal direction of the reading device EDA and the horizontal direction of the image forming region RZ, so that the reference signals Sr1 and Sr2 reflect this angle change. Therefore, the control of the color demodulating carriers S1 and S2 in response to the reference signals Sr1 and Sr2 ensures accurate detection of the color information regardless of such a change of the angle between the longitudinal direction of the reading device EDA and the horizontal direction of the image forming region RZ.

DESCRIPTION OF THE THIRD PREFERRED EMBODIMENT

Figure 23:
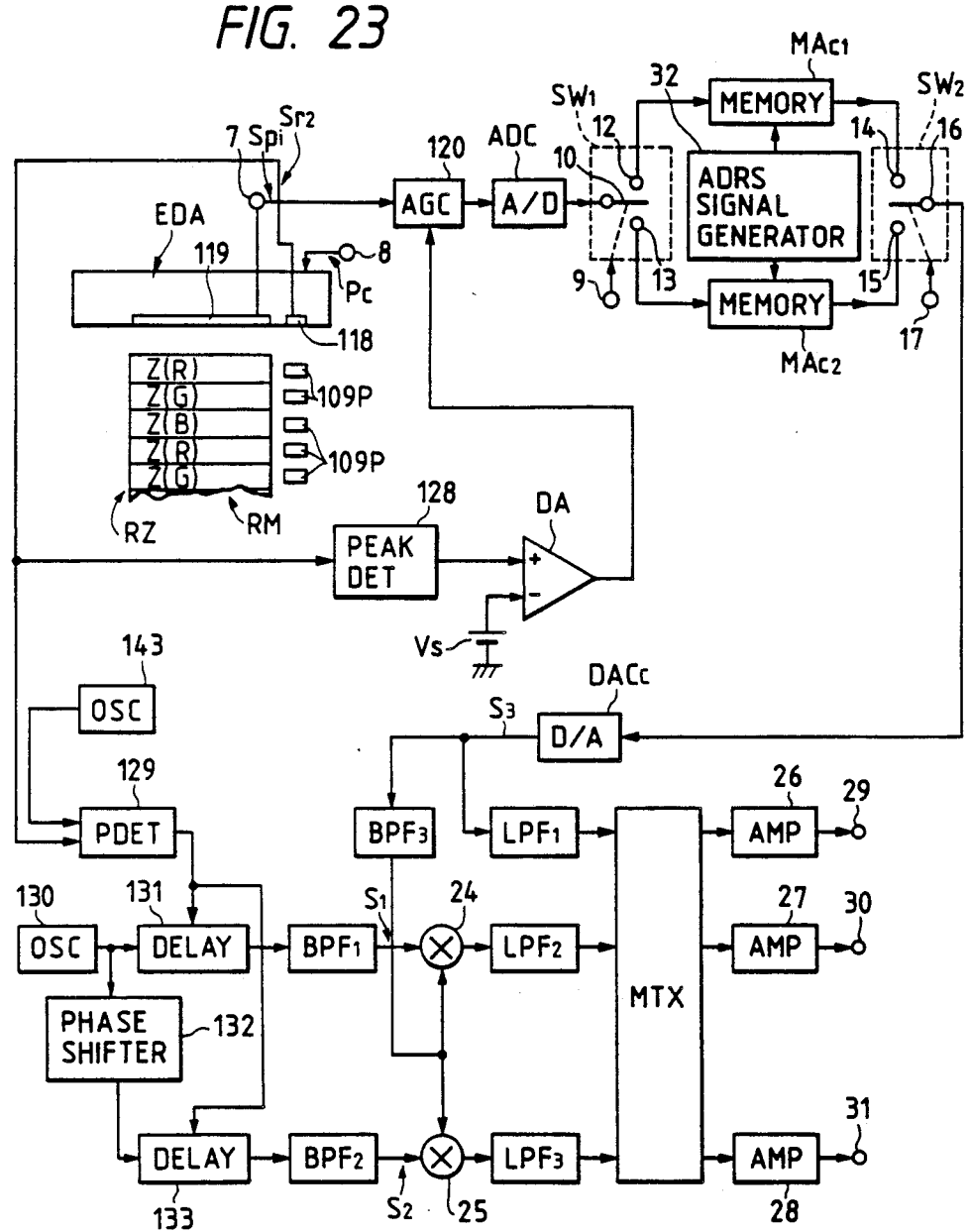
FIG. 23 is a block diagram of a circuit for processing output signals from a reading device in a third embodiment of this invention.

FIG. 23 shows a third embodiment of this invention which is similar to the embodiment of FIGS. 14–21 except for designs indicated hereinafter. The transparent regions 108 are omitted from the mask pattern PMP (see FIG. 16). Therefore, the reference regions 108P (see FIG. 19) are absent from this embodiment. The sensing part 117 (see FIG. 19) is omitted from the reading device EDA.

The output signal from the sensing part 118 is fed to the peak detector 128 in place of the output signal from the sensing part 117. The output signal from an oscillator 143 is fed to the phase detector 129 in place of the output signal from the sensing part 117. The output signal from the oscillator 143 has a constant frequency and represents a reference phase.

DETAILED OF THE FOURTH PREFERRED EMBODIMENT

Figure 25:
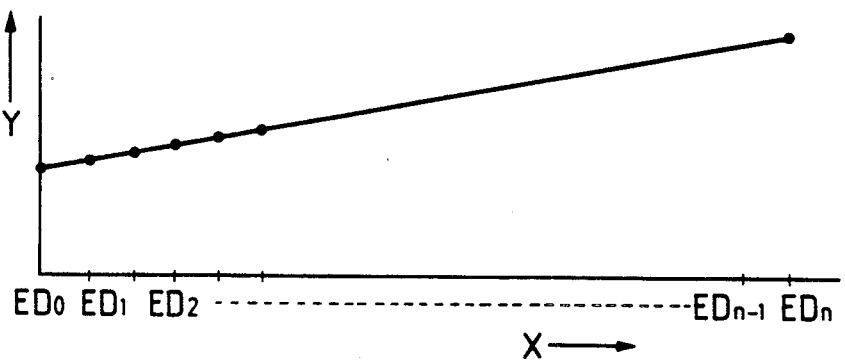
FIG. 25 is a diagram showing the levels of the electric potentials which are induced at the respective sensing electrodes when the reading device inclines relative to the recording medium as shown in FIG. 20.
Figure 24:
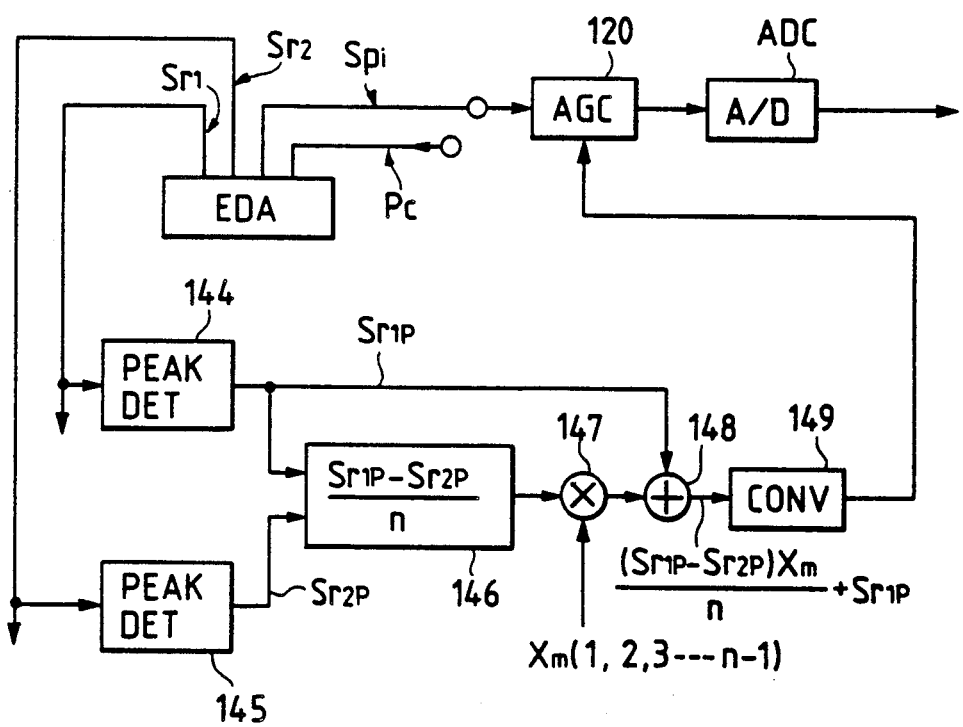
FIG. 24 is a block diagram of a circuit for processing output signals from a reading device in a fourth embodiment of this invention.

FIG. 24 shows a fourth embodiment of this invention which is similar to the embodiment of FIGS. 14-21 except for designs indicated hereinafter. In the embodiment of FIGS. 14-21, under conditions where the whole of the working surface of the recording medium RM exhibits a constant electric potential, when the line of the sensing electrodes ED0, ED1, ED2, . . . , EDn−1, and EDn inclines relative to the working surface of the recording medium RM as shown in FIG. 20, the electric potentials induced at the sensing electrodes ED0, ED1, ED2, . . . , EDn−1, and EDn vary as shown in FIG. 25. This embodiment has an automatic gain control loop which is designed to operate satisfactorily regardless of whether or not the line of the sensing electrodes ED0, ED1, ED2, . . . , ENn−1, and EDn inclines relative to the working surface of the recording medium RM.

A peak detector 144 detects the peak levels of the reference signal Sr1 and outputs the peak level signal Sr1p to a calculator 146 and an adder 148. Another peak detector 145 detects the peak levels of the reference signal Sr2 and outputs the peak level signal Sr2p to the calculator 146. The calculator generates a signal corresponding to the value "(Sr1p−Sr2p)/n" equal to the difference between the levels of the signals Sr1p and Sr2p which is divided by the number "n" of the sensing electrodes ED1−EDn. A multiplier 147 multiplies the output signal from the calculator 146 by a signal Xm which sequentially and periodically assumes different levels corresponding to "1", "2", . . . "n−1" respectively. The timing of the level change of the signal Xm has a predetermined relation with the timing of the selection of the sensing electrodes ED1, ED2, . . . , EDn−1. Specifically, when the color signal Spi corresponding to the sensing electrode ED1 is inputted into the automatic gain control circuit 120, the signal Xm assumes the level corresponding to "1". When the color signal Spi corresponding to the sensing electrode ED2 is inputted into the automatic gain control circuit 120, the signal Xm assumes the level corresponding to "2". Similarly, when the color signal Spi corresponding to the sensing electrode EDn−1 is inputted into the automatic gain control circuit 120, the signal Xm assumes the level corresponding to "n−1". The adder 148 adds the output signals from the peak detector 144 and the multiplier 147 and generates a signal corresponding to the value "{(Sr1p−Sr2p)Xm/n}+Sr1p" equal to the sum of the levels of the output signals from the peak detector 144 and the multiplier 147. A polarity converter 149 inverts the polarity of the output signal from the adder 148 and generates a gain control signal fed to the the automatic gain control circuit 120. Under conditions where the electric potentials induced at the respective sensing electrodes ED1, ED2, . . . , EDn−1 are varied by the inclination of the line of the sensing electrodes ED1, ED2, . . . , EDn−1 relative to the working surface of the recording medium RM as shown in FIGS. 20 and 25, the automatic gain control circuit 120 functions to compensate this induced potential variation to derive a level-adjusted color signal.

What is claimed is:

1. An apparatus for recording and reproducing a color image via a charge latent image, comprising:
    an optical filter including a color separation section and an index section, the color separation section including recurrent groups each having stripes of at least three different colors, the index section including a pattern related to a period of the recurrent groups in the color separation section;
    a photoconductive member;
    a recording member;
    means for focusing an optical image on the photoconductive member via the filter;
    means for forming a charge latent image on the recording member in response to the optical image on the photoconductive member, the charge latent image having a color information region corresponding to the color separation section of the filter and an index region corresponding to the index section of the filter;
    means for detecting the charge latent image on the recording member;
    means for generating a color information signal in accordance with the detected charge latent image related to the color information region;
    means for generating an index signal in accordance with the detected charge latent image related to the index region; and
    means for demodulating color information from the generated color information signal on the basis of the generated index signal.

2. An apparatus for recording and reproducing a color image via a charge latent image, comprising:
    an optical filter including a color separation section and an index section, the color separation section including recurrent groups each having parallel stripes of at least three different colors, the index section including a pattern of parallel stripes extending parallel to the stripes in the color separation section, the pattern being related to a period of the recurrent groups in the color separation section;
    a photoconductive member;
    a recording member;
    means for focusing an optical image on the photoconductive member via the filter;
    means for forming a charge latent image on the recording member in response to the optical image on the photoconductive member, the charge latent image having a color information region corresponding to the color separation section of the filter and an index region corresponding to the index section of the filter;
    means for scanning the charge latent image in a main scanning direction approximately corresponding to a longitudinal direction of the stripes in the filter and scanning the charge latent image in a sub scanning direction substantially perpendicular to the main scanning direction to sequentially detect segments of the charge latent image on the recording member, and for generating a first signal sequentially representing the detected segments of the charge latent image, wherein the detected segments represented by the first signal are ordered on a time axis along a direction corresponding to the main scanning direction;
    means for converting the first signal into a second signal sequentially representing the detected segments of the charge latent image, wherein the detected segments represented by the second signal are ordered on a time axis along a direction corresponding to the sub scanning direction;

means for generating a color information signal on the basis of the second signal representing the detected segments of the charge latent image which relate to the color information region;

means for generating a reference signal on the basis of the second signal representing the detected segments of the charge latent image which relate to the index region; and means for demodulating color information from the generated color information signal on the basis of the generated reference signal.

* * * * *